(12) United States Patent
Uematsu et al.

(10) Patent No.: US 11,886,012 B2
(45) Date of Patent: Jan. 30, 2024

(54) OPTICAL FIBER LATERAL INPUT/OUTPUT DEVICE

(71) Applicant: NIPPON TELEGRAPH AND TELEPHONE CORPORATION, Tokyo (JP)

(72) Inventors: Takui Uematsu, Musashino (JP); Hidenobu Hirota, Musashino (JP); Hiroyuki Iida, Musashino (JP); Naotsugu Ambe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 225 days.

(21) Appl. No.: 17/427,848

(22) PCT Filed: Jan. 22, 2020

(86) PCT No.: PCT/JP2020/002031
§ 371 (c)(1),
(2) Date: Aug. 2, 2021

(87) PCT Pub. No.: WO2020/162170
PCT Pub. Date: Aug. 13, 2020

(65) Prior Publication Data
US 2022/0128765 A1 Apr. 28, 2022

(30) Foreign Application Priority Data
Feb. 5, 2019 (JP) .................................. 2019-019080

(51) Int. Cl.
*G02B 6/28* (2006.01)
(52) U.S. Cl.
CPC ................... *G02B 6/2821* (2013.01)
(58) Field of Classification Search
CPC ..................................................... G02B 6/2821
See application file for complete search history.

(56) References Cited

U.S. PATENT DOCUMENTS

| 5,333,217 | A | * | 7/1994 | Kossat | ................. | G02B 6/4289 |
| | | | | | | 385/32 |
| 2011/0217004 | A1 | * | 9/2011 | Niimi | ................... | G02B 6/2852 |
| | | | | | | 385/32 |

FOREIGN PATENT DOCUMENTS

| JP | S6296606 U | 6/1987 |
| JP | S63253907 A | 10/1988 |

(Continued)

OTHER PUBLICATIONS

Takui Uematsu et al., "Optical signal extraction from optical fiber covered with a loose tube" IEICE Technical Report, vol. 117, No. 387, 2018, pp. 15-18.

*Primary Examiner* — Sung H Pak
*Assistant Examiner* — Hoang Q Tran
(74) *Attorney, Agent, or Firm* — Harness, Dickey & Pierce, P.L.C.

(57) ABSTRACT

An object of the present invention is to provide a versatile optical fiber lateral output device that can deal with various types of optical fiber core wires. An optical fiber input-output device according to the present invention includes: a first jig 11 including a recess portion 22 and an optical input-output means 51; a second jig 12 including a projection portion 23 and a guide groove 24; and a pressing unit 14 configured to apply a pressing force in a direction in which the recess portion 22 of the first jig 11 and the projection portion 23 of the second jig 12 approach each other so as to bend an optical fiber core wire 100. Letting R1 be a curvature radius of the recess portion 22 of the first jig 11, θ1 be a central angle of the recess portion 22, R2 be a curvature radius of the projection portion 23 of the second jig 12, and θ2 be a central angle of the projection portion 23, R2≤R1 and θ2≤θ1 are satisfied.

14 Claims, 13 Drawing Sheets

(56) References Cited

FOREIGN PATENT DOCUMENTS

| JP | 201540916 A | 3/2015 |
|----|-------------|--------|
| JP | 2017138342 A | 8/2017 |
| JP | 201884465 A | 5/2018 |

* cited by examiner (A)

OPTICAL FIBER CORE WIRE
HAVING DIAMETER OF 0.25 mm (B)

OPTICAL FIBER CORE WIRE
HAVING DIAMETER OF 0.50 mm (C)

TUBE CORE WIRE
HAVING DIAMETER OF 0.90 mm

OPTICAL FIBER LATERAL INPUT/OUTPUT DEVICE

CROSS-REFERENCE TO RELATED APPLICATIONS

This application is a 371 U.S. National Phase of International Application No. PCT/JP2020/002031 filed on Jan. 22, 2020, which claims priority to Japanese Application No. 2019-019080 filed on Feb. 5, 2019. The entire disclosures of the above applications are incorporated herein by reference.

TECHNICAL FIELD

The present disclosure relates to an optical fiber lateral input/output device that inputs and outputs light to and from a lateral side of a bent optical fiber core wire.

BACKGROUND ART

As a technique for inputting and outputting an optical signal to and from an optical fiber without cutting the optical fiber, an optical fiber lateral input/output technique has come under review in which an existing optical fiber (actually-used optical fiber) is bent and another optical fiber (probe optical fiber) is opposed to this bent portion from a lateral side thereof, so that an optical signal is incident on the actually-used optical fiber from a leading end portion of the probe optical fiber and an optical signal output from the actually-used optical fiber is received at the leading end portion of the probe optical fiber (see, for example, PTL 1).

CITATION LIST

Patent Literature

[PTL 1] Japanese Patent Application Publication No. 2015-040916

Non Patent Literature

[NPL 1] Uematsu et al. "Optical signal extraction from optical fiber covered with a loose tube" IEICE Technical Report, vol. 117, no. 387, OFT 2017-59, pp. 15-18, 2018

SUMMARY OF THE INVENTION

Technical Problem

Various types of optical fiber core wires are laid at a connection point of an existing wire path, which is one of applications of the optical fiber lateral input/output technique. Even when focusing single core wires, there are single core wires whose outer diameters are 0.25 mm, 0.5 mm, and 0.9 mm. Also, each optical fiber core wire to be bent has an optimal bent shape. Accordingly, an operator needs to prepare an optical fiber lateral output device optimized for the bent shape of each type of optical fiber core wire, and operate while changing the optical fiber lateral output device according to the core wire type.

In other words, a conventional optical fiber lateral output device is dedicated for a predetermined type of operation-target optical fiber core wire, and has the problem that it lack versatility. Accordingly, to solve the above-described problem, an object of the present invention is to provide a versatile optical fiber lateral output device that can deal with various types of optical fiber core wires.

Means for Solving the Problem

To achieve the foregoing object, the optical fiber lateral output device according to the present invention realizes, with respect to first and second jigs for clamping an optical fiber core wire, the optimization of the shapes of the first jig and the second jig, the shape of a guide groove of the second jig, and the pressing force for forming a bend.

Specifically, the optical fiber lateral output device according to the present invention includes: a first jig including a recess portion that is curved in a longitudinal direction of an optical fiber core wire, and an optical input-output means for causing light to be incident on the optical fiber core wire that is bent and receiving light leaked from the optical fiber core wire; a second jig including a projection portion that is curved in the longitudinal direction of the optical fiber core wire and is configured to clamp the optical fiber core wire with the recess portion of the first jig, and a guide groove that is formed in the projection portion and into which the optical fiber core wire is to be fitted; and a pressing unit configured to apply a pressing force in a direction in which the recess portion of the first jig and the projection portion of the second jig approach each other so as to bend the optical fiber core wire, wherein letting $R_1$ be a curvature radius of the recess portion of the first jig, $\theta_1$ be a central angle of the recess portion, $R_2$ be a curvature radius of the projection portion of the second jig, and $\theta_2$ be a central angle of the projection portion, $R_2 \leq R_1$ and $\theta_2 \leq \theta_1$ are satisfied.

Since the structure is such that the lowest point of the first jig and the highest point of the second jig come into contact with each other, a pressing force can be applied only to a narrow region of a portion to be bent, and various types of optical fiber core wires can be dealt with. Accordingly, the present invention can provide a versatile optical fiber lateral output device that can deal with various types of optical fiber core wires.

The optical fiber lateral output device according to the present invention is such that $R_1 - 0.125 < R_2 \leq R_1$ (mm) is satisfied. Desired bend loss and binding efficiency can be obtained.

In the optical fiber lateral output device according to the present invention, the cross-sectional shape of the guide groove that is perpendicular to the longitudinal direction of the optical fiber core wire is an isosceles triangle with an opening into which the optical fiber core wire is to be inserted in a direction from the first jig serving as the base, and the isosceles triangle satisfies a $(1+1/\sin\theta) \geq w/\tan\theta$ where W is a width of the opening, $2\theta$ is the vertex angle, and $2a$ is an outer diameter of the optical fiber core wire.

As a result of the cross-sectional shape of the guide groove of the second jig being an isosceles triangle, it is possible to deal with various types of optical fiber core wires.

For example, a=0.125 mm is satisfied. Three types of core wires, namely, single core wires whose outer diameter is 0.25 mm and 0.5 mm, and a tube core wire whose outer diameter is 0.9 mm can be dealt with.

In the optical fiber lateral output device according to the present invention, the pressing unit has an adjustment function to adjust the pressing force. It is possible to apply an appropriate pressing force according to the type of optical fiber core wire.

For example, in the optical fiber lateral output device according to the present invention, the adjustment function is a function to switch the pressing force according to the type of the optical fiber core wire.

For example, the adjustment function of the optical fiber lateral output device according to the present invention is such that the number of pressing forces to be switched is less than the number of types of optical fiber core wires to be dealt with. The configuration of the optical fiber lateral output device can be simplified.

For example, in the optical fiber lateral output device according to the present invention, the adjustment function changes the pressing force based on a distance S between the lowest point of the recess portion and the highest point of the projection portion when the optical fiber core wire is bent. It is possible to deal with a tube core wire by changing the pressing force during pressing.

Effects of the Invention

The present invention can provide a versatile optical fiber lateral output device that can deal with various types of optical fiber core wires.

DESCRIPTION OF EMBODIMENTS

Figure 1:
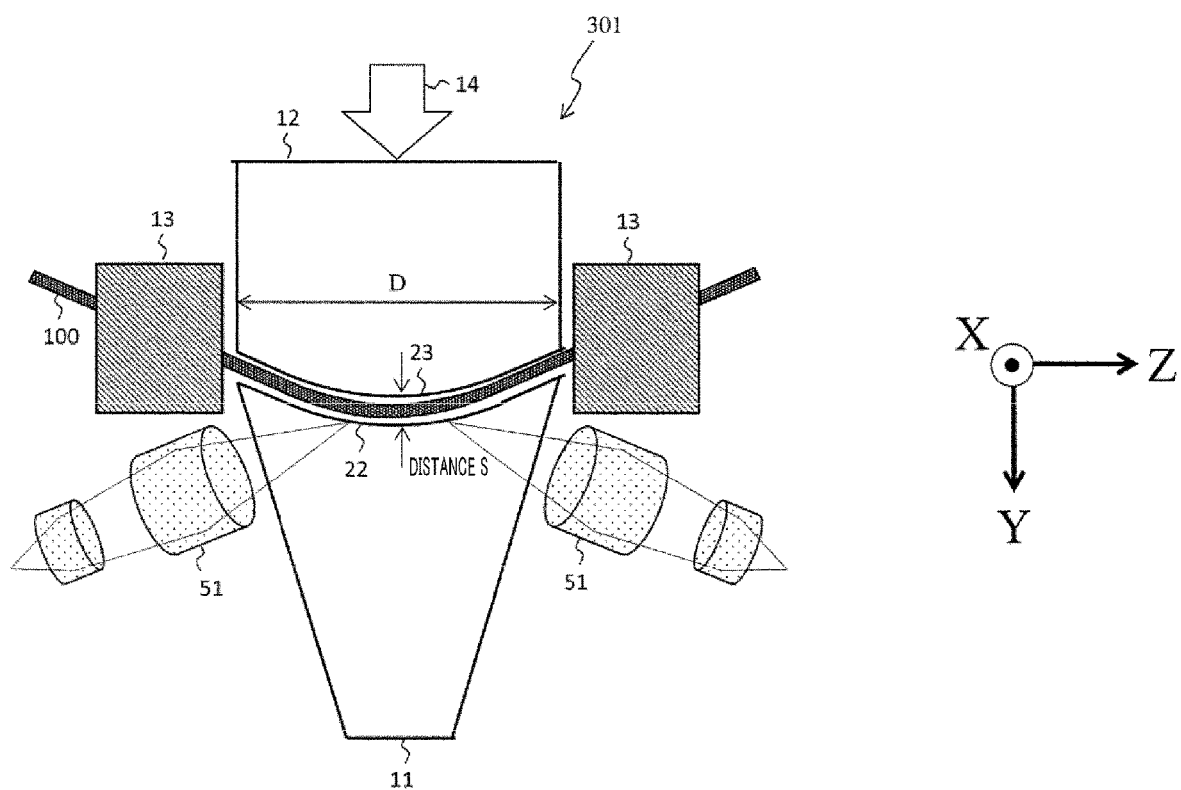
FIG. 1 is a diagram illustrating an optical fiber input-output device according to the present invention.

Embodiments of the present invention will be described with reference to the accompanying drawings. The below-described embodiments are working examples of the present invention, and the present invention is not limited to the following embodiments. Note that in the specification and the drawings, the constituent components having like reference numerals are components equivalent to each other.

Figure 2:
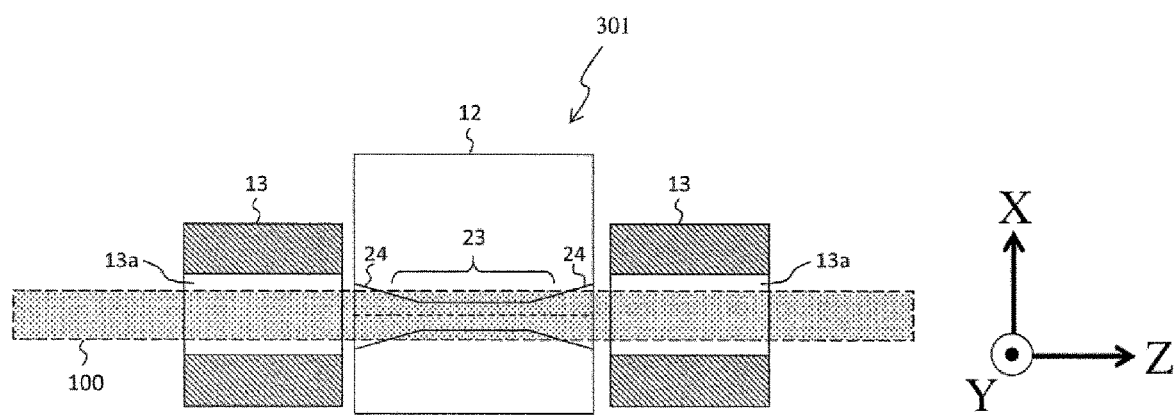
FIG. 2 is a diagram illustrating the optical fiber input-output device according to the present invention.
Figure 3:
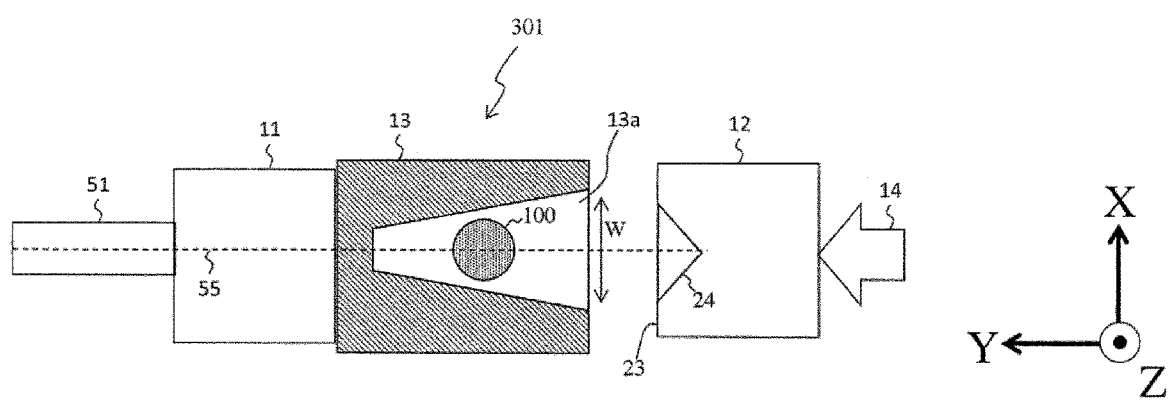
FIG. 3 is a diagram illustrating the optical fiber input-output device according to the present invention.

FIGS. 1, 2, and 3 show an optical fiber input-output device according to the present embodiments in a top view (seen from the positive direction to the negative direction of the X axis), a side view (seen from positive direction to the negative direction of the Y axis), and a side view (seen from positive direction to the negative direction of the Z axis), respectively.

The present optical fiber input-output device includes:
- a first jig 11 including a recess portion 22 that is curved in a longitudinal direction of an optical fiber core wire 100, and an optical input-output means 51 for causing light to be incident on the optical fiber core wire 100 that is bent and receiving light leaked from the optical fiber core wire 100;
- a second jig 12 including a projection portion 23 that is curved in the longitudinal direction of the optical fiber core wire 100 and is configured to clamp the optical fiber core wire 100 with the recess portion 22 of the first jig 11, and a guide groove 24 that is formed in the projection portion 23 and in which the optical fiber core wire 100 is to be fitted; and
- a pressing unit 14 configured to apply a pressing force in a direction in which the recess portion 22 of the first jig 11 and the projection portion 23 of the second jig 12 approach each other so as to bend the optical fiber core wire 100,
- wherein letting R1 be the curvature radius of the recess portion 22 of the first jig 11, θ1 be the central angle of the recess portion 22, R2 be the curvature radius of the projection portion 23 of the second jig 12, and θ2 be the central angle of the projection portion 23, R2≤R1 and θ2≤θ1 are satisfied.

Also, the present optical fiber input-output device further includes core wire guides 13 that are disposed on two ends of the recess portion 22 of the first jig 11 in the longitudinal direction of the optical fiber core wire 100, and guide, when the pressing unit 14 bends the optical fiber core wire 100, the optical fiber core wire 100 in a predetermined route formed of the guide groove 24 of the second jig 12 and the recess portion 22 of the first jig 11 regardless of the diameter of the optical fiber core wire 100.

The optical fiber core wire 100 is bent by being clamped between the first jig 11 and the second jig 12, and light is input to and output from the optical fiber core wire 100 by the optical input-output means 51. The guide groove 24 is formed in the projection portion 23 of the second jig 12 and guides the optical fiber core wire 100 to a desired position each time the optical fiber core wire 100 is clamped. Also, the core wire guides 13 are provided adjacent to both ends of the bent portion, and the optical fiber core wire 100 is guided into the guide groove 24 of the second jig 12 by the core wire guides 13.

The present optical fiber input-output device can deal with various types of optical fiber core wires (for example, three types, namely, a single core wire of 0.25 mm, a single core wire of 0.5 mm, and a tube core wire of 0.9 mm) with a single structure, eliminating the need of changing the first jig 11, the second jig 12, the guide groove 24, the core wire guides 13, and the optical input-output means 51 according to the type of optical fiber core wire.

In this context, "dealing with" means a situation in which the bend loss (wavelength 1550 nm) with respect to all of the three types of core wires is 2 dB or less, and the binding efficiency (wavelength 1310 nm) is −33 dB or less. The binding efficiency refers to efficiency in a direction from the optical fiber core wire to the optical input-output means, and the binding efficiency is set as P2−P1 (dB) where P1 (dBm) is the intensity of light propagating in the optical fiber core wire and P2 (dBm) is the intensity of light received by the optical input-output means.

Working Example 1

Figure 4:
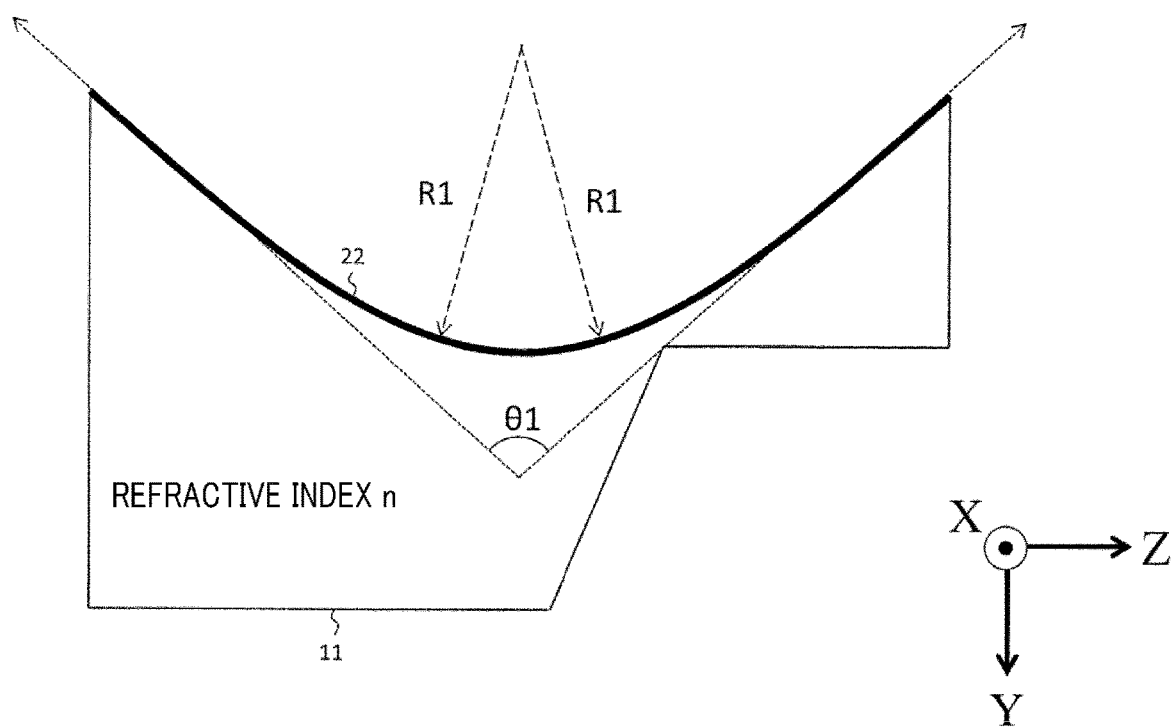
FIG. 4 is a diagram illustrating the optical fiber input-output device according to the present invention.
Figure 5:
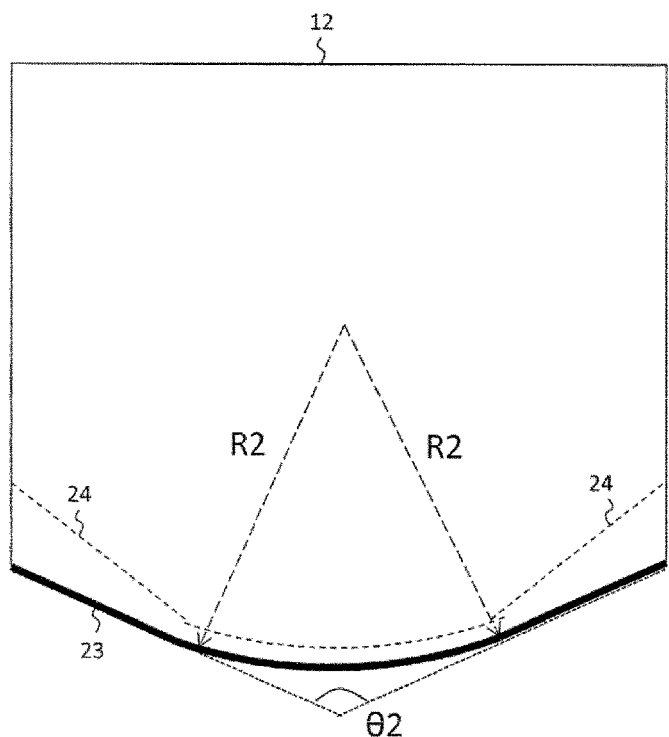
FIG. 5 is a diagram illustrating the optical fiber input-output device according to the present invention.
Figure 5:
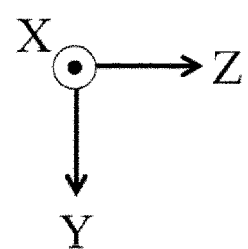

FIGS. 4 and 5 are diagrams illustrating the optical fiber input-output device of the present working example. In the present working example, the conditions of the first jig 11 and the second jig 12 will be described. The first jig 11 and the second jig 12 need to have a structure such that the lowest point of the recess portion 22 and the highest point of the projection portion 23 come into contact with each other, and thus it is desirable that R1≥R2 and θ1≥θ2 are satisfied, where R1 and el are the curvature radius and the central angle of the recess portion 22 of the first jig 11, and R2 and θ2 are the curvature radius and the central angle of the projection portion 23 of the second jig 12.

Working Example 2

Figure 6:
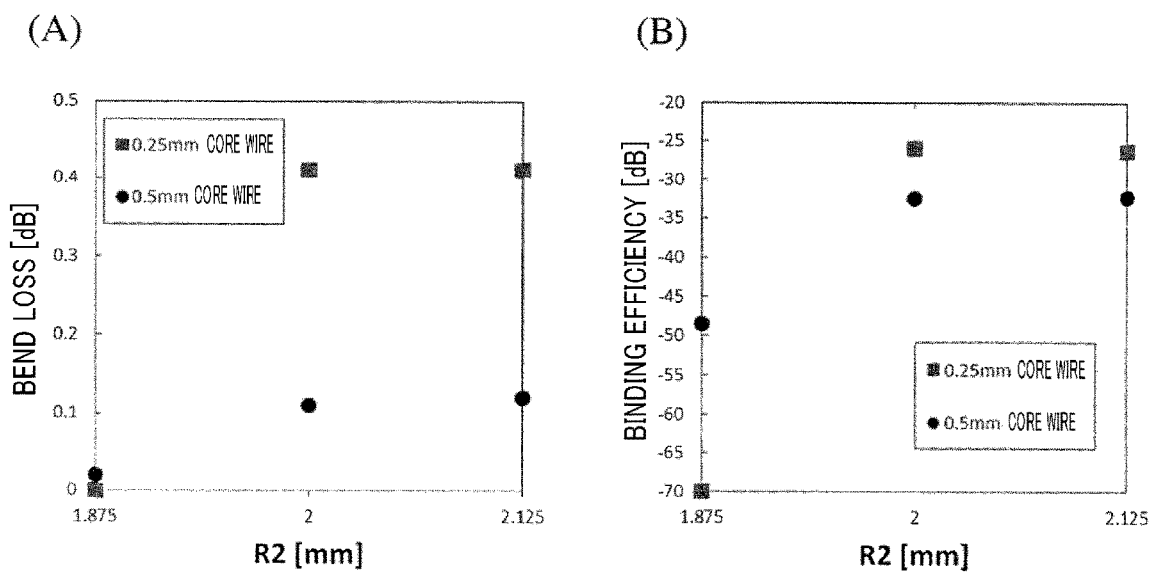
FIG. 6 are diagrams illustrating the bend loss and binding efficiency of the optical fiber input-output device according to the present invention.

FIG. 6 are diagram illustrating a change in the bend loss (FIG. 6(A)) and a change in the binding efficiency (FIG. 6(B)), when R1=2.125 mm and R2 is varied. The bend loss is 2 dB or less as long as the value of R2 is between 1.85 and 2.125 mm, and meets the above-described standard of "dealing with", but the binding efficiency cannot meet the above-described standard of "dealing with" when R2≤1.875 (=R1−0.25). Accordingly, the following Expression 1 is desirable.

$$R1-0.25<R2\leq R1$$

Working Example 3

Figure 7:
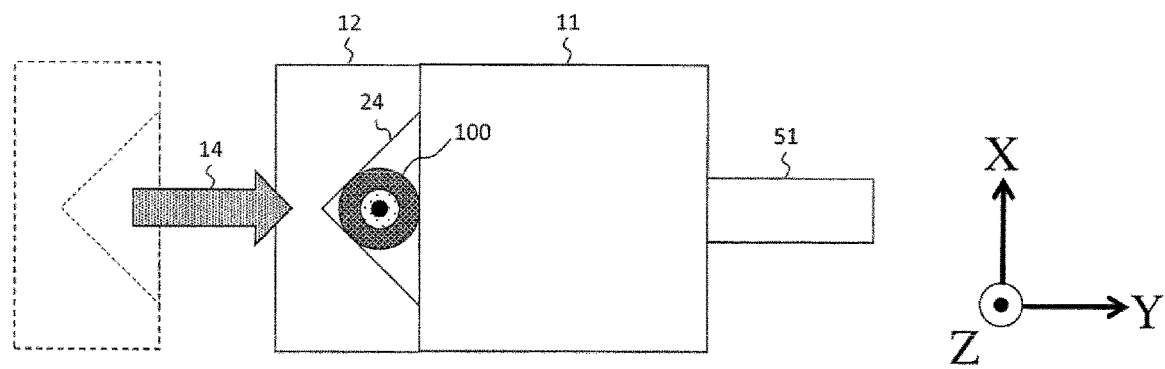
FIG. 7 is a diagram illustrating the optical fiber input-output device according to the present invention.
Figure 8:
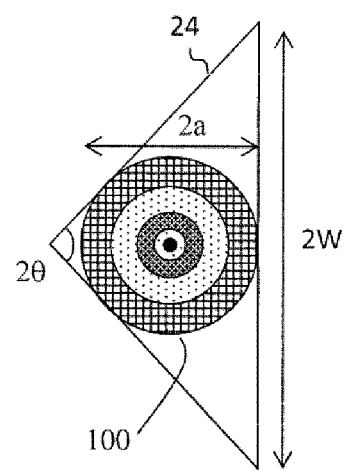
FIG. 8 is a diagram illustrating a guide groove of the optical fiber input-output device according to the present invention.

FIG. 7 is a diagram illustrating an optical fiber input-output device according to the present working example. FIG. 8 is an enlarged view of a guide groove 24 of the optical fiber input-output device of FIG. 7. The cross-sectional shape of the guide groove 24 of the present optical fiber input-output device that is perpendicular to the longitudinal direction (Z axial direction) the optical fiber core wire 100 is an isosceles triangle with an opening into which the optical fiber core wire 100 is inserted in a direction from the first jig 11 serving as the base, wherein the isosceles triangle satisfies the following Expression 2

$$a(1+1/\sin \theta)\geq w/\tan \theta$$

where W is the width of the opening, 2θ is the vertex angle, and 2a is the outer diameter of the optical fiber core wire 100.

Here, 2a is the smallest value of the outer diameters of optical fiber core wires to be dealt with. For example, if three types of optical fiber core wires, namely, a single core wire of 0.25 mm, a single core wire of 0.5 mm, and a tube core wire of 0.9 mm are to be dealt with, a=0.125 mm is desirable. As a result of setting 2a as the smallest value of the outer diameters of optical fiber core wires to be dealt with, any of the optical fiber core wires having the above-described outer diameters partially protrudes from the opening of the guide groove 24, and thus the optical fiber core wire 100 and the first jig 11 come into contact with each other. Thus, light can be input and output between the optical fiber core wire 100 and the optical input-output means 51 in a state in which no gap is created between the optical fiber core wire 100 and the first jig 11. Accordingly, the present optical fiber input-output device is applicable to all of the optical fiber core wires.

On the other hand, if Expression 2 is not satisfied, a gap will be created between the optical fiber core wire 100 and the first jig 11, and the binding efficiency will be reduced significantly.

Working Example 4

Figure 9:
FIG. 9 are diagram each illustrating across section of an optical fiber core wire.
Figure 9:
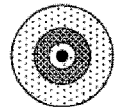
Figure 9:
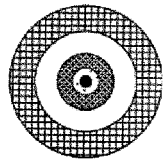

The optical fiber core wire whose diameter is 0.25 mm or 0.5 mm largely differs from the tube core wire protected by a tube whose diameter is 0.9 mm in the cross-sectional structure as shown in FIG. 9. Accordingly, the pressing forces required to bend the optical fiber core wires are largely different from each other. Specifically, in the case of the tube core wire of 0.9 mm, the tube need to be pressed and flattened to eliminate the gap between the optical fiber core wire and the tube (see, for example, NPL 1). Accordingly, a larger pressing force is required to bend the tube core wire than the pressing force required to bend the optical fiber core wires shown in FIG. 9(A) or 9(B). In other words, it is difficult to deal with the three types of optical fiber core wires using the same pressing force.

Accordingly, the pressing unit 14 of the optical fiber input-output device of the present working example has an adjustment function to adjust the pressing force. For example, the adjustment function can apply different pressing forces to the respective optical fiber core wire having the diameter of 0.25 mm shown in FIG. 9(A), the optical fiber core wire having the diameter of 0.5 mm shown in FIG. 9(B), and the tube core wire protected by a tube having the diameter of 0.9 mm shown in FIG. 9(C). Letting f1, f2, and f3 (f1≤f2≤f3) be the respective pressing forces required to bend the optical fiber core wire having the diameter of 0.25 mm shown in FIG. 9(A), the optical fiber core wire having the diameter of 0.5 mm shown in FIG. 9(B), and the tube core wire protected by a tube having the diameter of 0.9 mm shown in FIG. 9(C), the adjustment function is adjustable between f1 and f3.

Here, the adjustment function is a function to switch the pressing force according to the type of optical fiber core wire. Specifically, the adjustment function is a selector switch, and is capable of switching the pressing force between three stages, namely, f1, f2, or f3.

Also, the selector switch may be such that the number of pressing forces to be switched is less than the number of types of optical fiber core wires to be dealt with. For example, the pressing forces required to bend the optical fiber core wires of FIGS. 9(A) and 9(B) are smaller than the pressing force required to bend the tube core wire of FIG. 9(C), and a difference between the pressing forces between the optical fiber core wires is small. Therefore, the same pressing force (pressing force f'1 that is greater than or equal to f2) is set for the optical fiber core wires of FIGS. 9(A) and 9(B), and a pressing force f'2 that is greater than or equal to f3 is set for the tube core wire of FIG. 9(C), thereby realizing a two-stage selector switch. Accordingly, it is possible to adjust the pressing force with a simple configuration due to a reduction in the number of pressing forces to be switched.

Working Example 5

The present working example will describe a method in which the pressing force is automatically adjusted. For example, when adjusting the pressing force, a method is conceivable in which an operator adjusts the pressing force according to the core wire type, but the method has poor work efficiency since the operator needs to distinguish the core wire type, and there is also the risk that if the operator makes a mistake in distinguishment, communication may be interrupted or the core wire may be broken. Therefore, the present working example will describe a method in which no external pressing force adjustment is needed.

The adjustment function of the optical fiber input-output device of the present working example is characterized in that the pressing force is changed based on a distance S between the lowest point of the recess portion 22 and the highest point of the projection portion 23 when the optical fiber core wire 100 is bent. In the following, the three types of optical fiber core wires shown in FIG. 9 will be described, but the same description will apply even if the number of core wire types increases.

Figure 10:
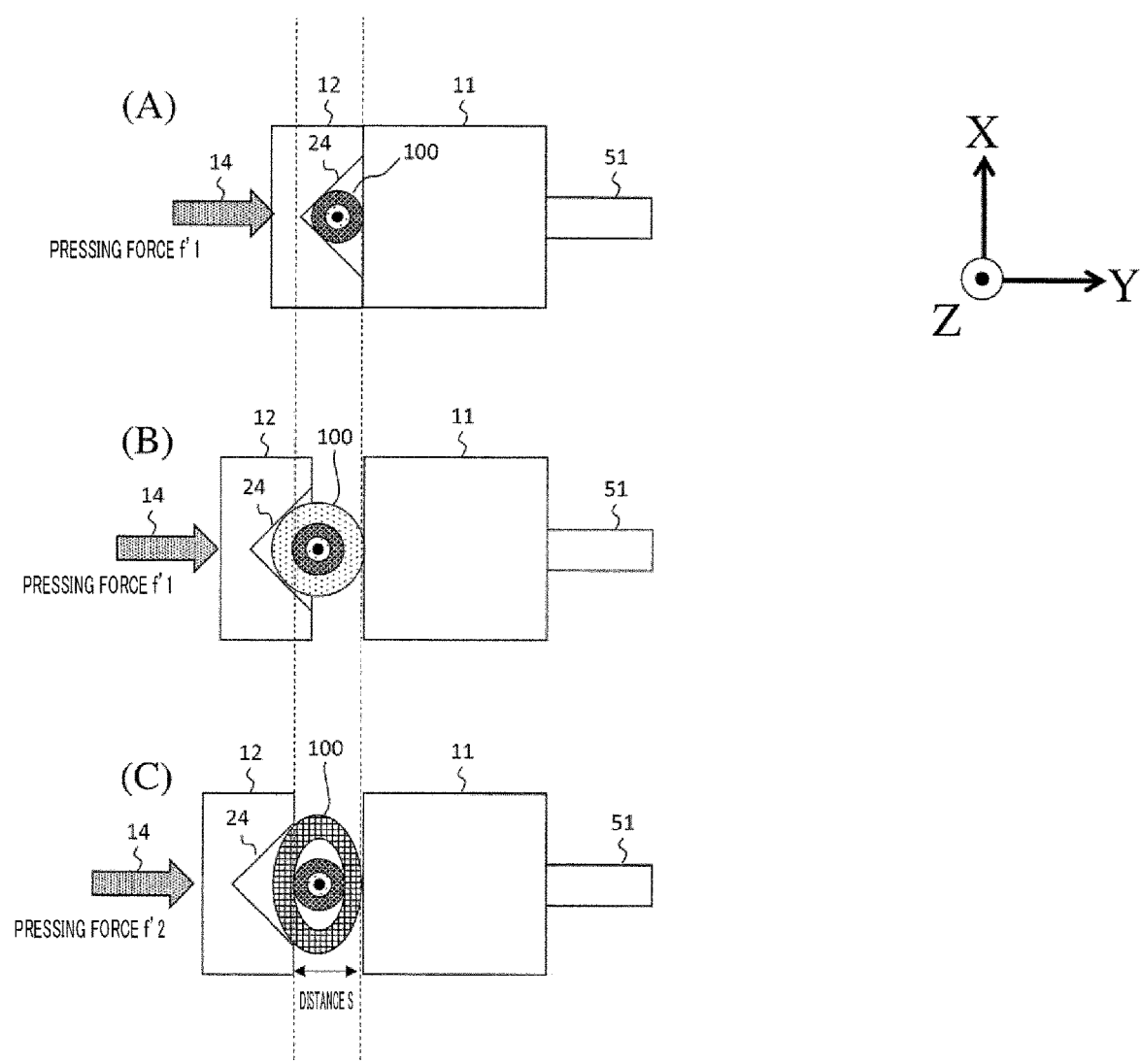
FIG. 10 are diagrams each illustrating an adjustment function of the optical fiber input-output device according to the present invention.

FIG. 10 are diagrams illustrating the adjustment function of the optical fiber input-output device according to the present working example. FIG. 10(A) shows an example of the optical fiber core wire having the diameter of 0.25 mm, FIG. 10(B) shows an example of the optical fiber core wire having the diameter of 0.5 mm, and FIG. 10(C) shows an example of the tube core wire protected by a tube having the diameter of 0.9 mm, in side views (seen from the positive side to the negative side of the Z axis) when the core wires are curved.

When the distance S between the lowest point of the recess portion 22 and the highest point of the projection portion 23 is a predetermined distance S' or more, the pressing force is f2 (≥f3), whereas when S<S' is satisfied, the pressing force is f1 (f2≤f1<f3). In other words, the pressing unit 14 applies the pressing force f2 when the second jig 12 approaches the first jig 11 to reach the state shown in FIG. 10(C). Accordingly, a pressing force required to press and flatten the tube can be applied to the tube core wire. On the other hand, the pressing unit 14 applies the pressing force f1 when the second jig 12 further approaches the first jig 11 to reach the state shown in FIG. 10(B) or 10(A). Accordingly, a pressing force for bending the optical fiber core wire whose diameter is 0.5 mm or 0.25 mm can be applied thereto. Also, in the case of the optical fiber core wire of 0.25 mm as shown in FIG. 10(A), the optical fiber core wire is fitted into the guide groove 24, and the first jig 11 and the second jig 12 are brought into contact with each other, making it possible to prevent the optical fiber core wire from being subjected to a too large pressing force.

A mechanism of the pressing unit that can change the pressing force will be described in Working Examples 6 and 7.

Working Example 6

Figure 11:
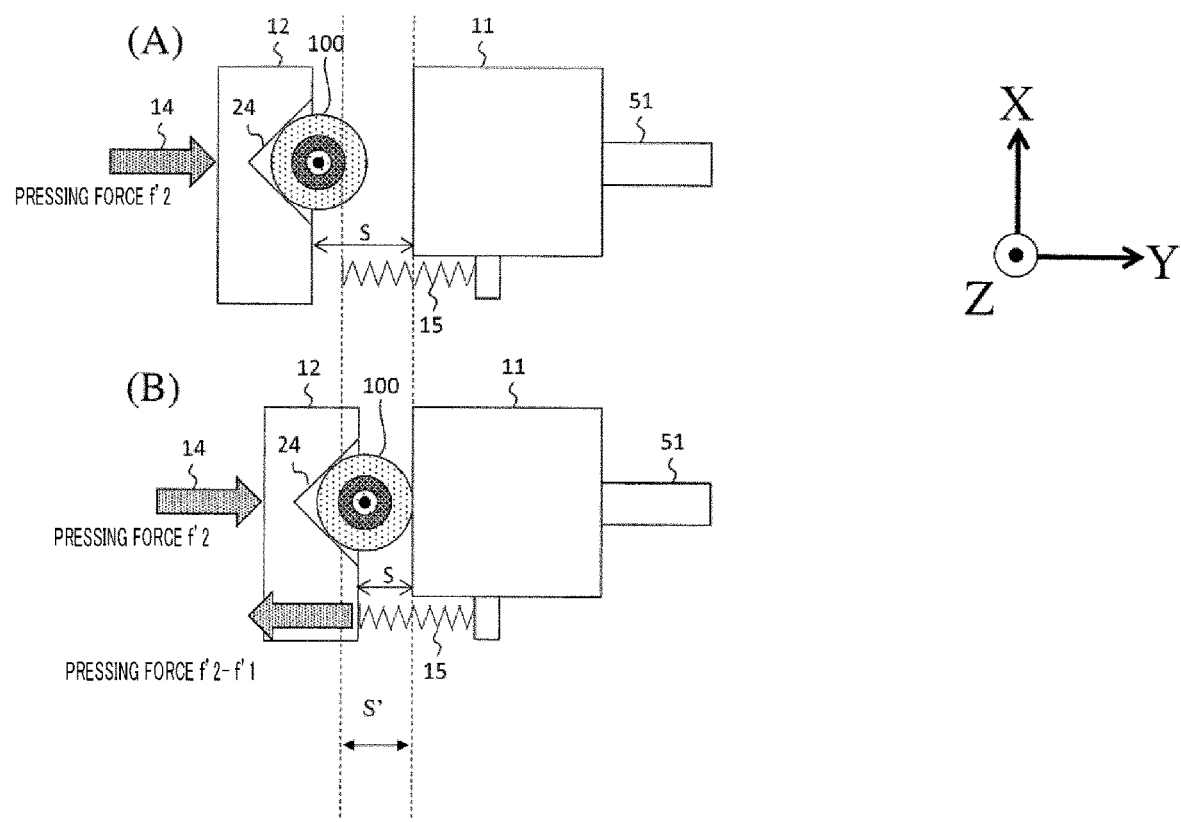
FIG. 11 are diagrams illustrating a specific example of the optical fiber input-output device according to the present invention.

FIG. 11 are cross-sectional views illustrating a mechanism for adjusting the pressing force in an optical fiber input-output device according to the present working example. These are cross sections of the optical fiber input-output device taken along the X-Y plane thereof and are views when seen from the positive side to the negative side of the Z axis.

This mechanism is a spring 15 that comes into contact with the second jig 12 and applies a pressing force f2−f1 to the second jig 12, when the distance S between the lowest point of the recess portion 22 and the highest point of the projection portion 23 satisfies S≤S'. As a result of using the spring 15, the pressing force f2 is applied when S>S' as shown in FIG. 11(A), and the pressing force f2−(f2−f1)=f1 is applied when S≤S'.

Note that the mechanism of the present working example is an example, and the present invention can be realized using another mechanism that has the same function.

Working Example 7

Figure 12:
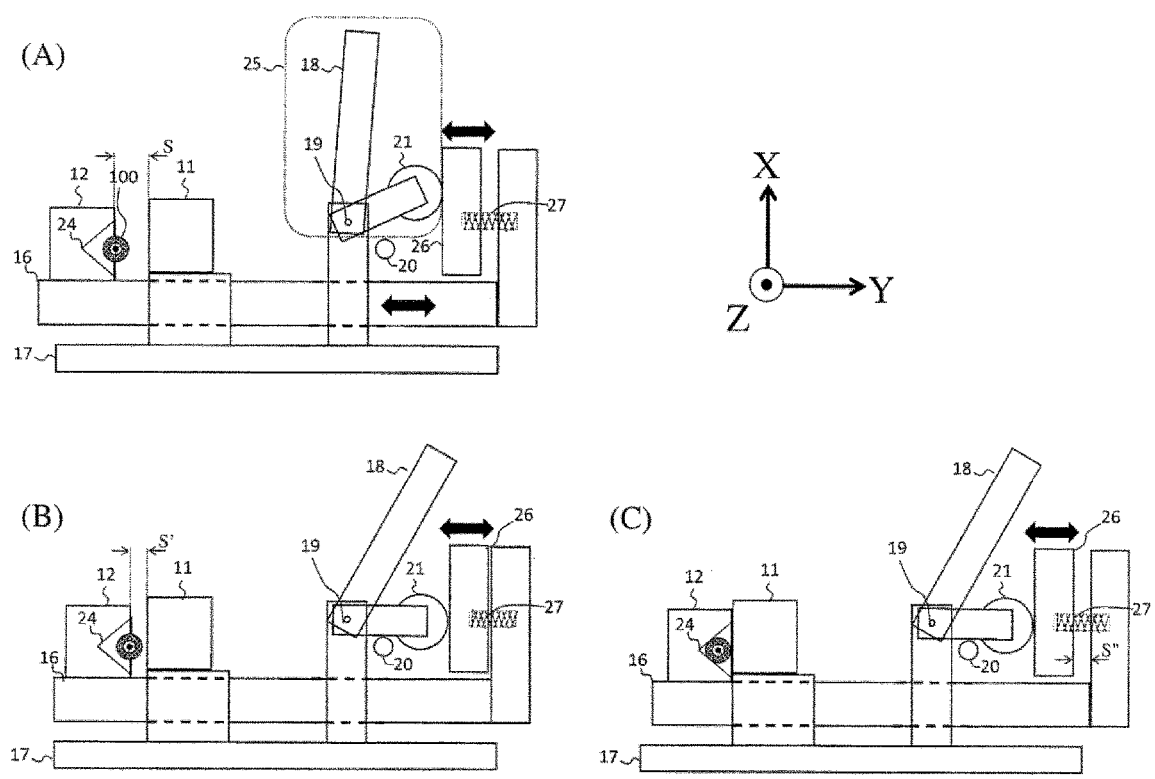
FIG. 12 are diagrams illustrating a specific example of the optical fiber input-output device according to the present invention.
Figure 13:
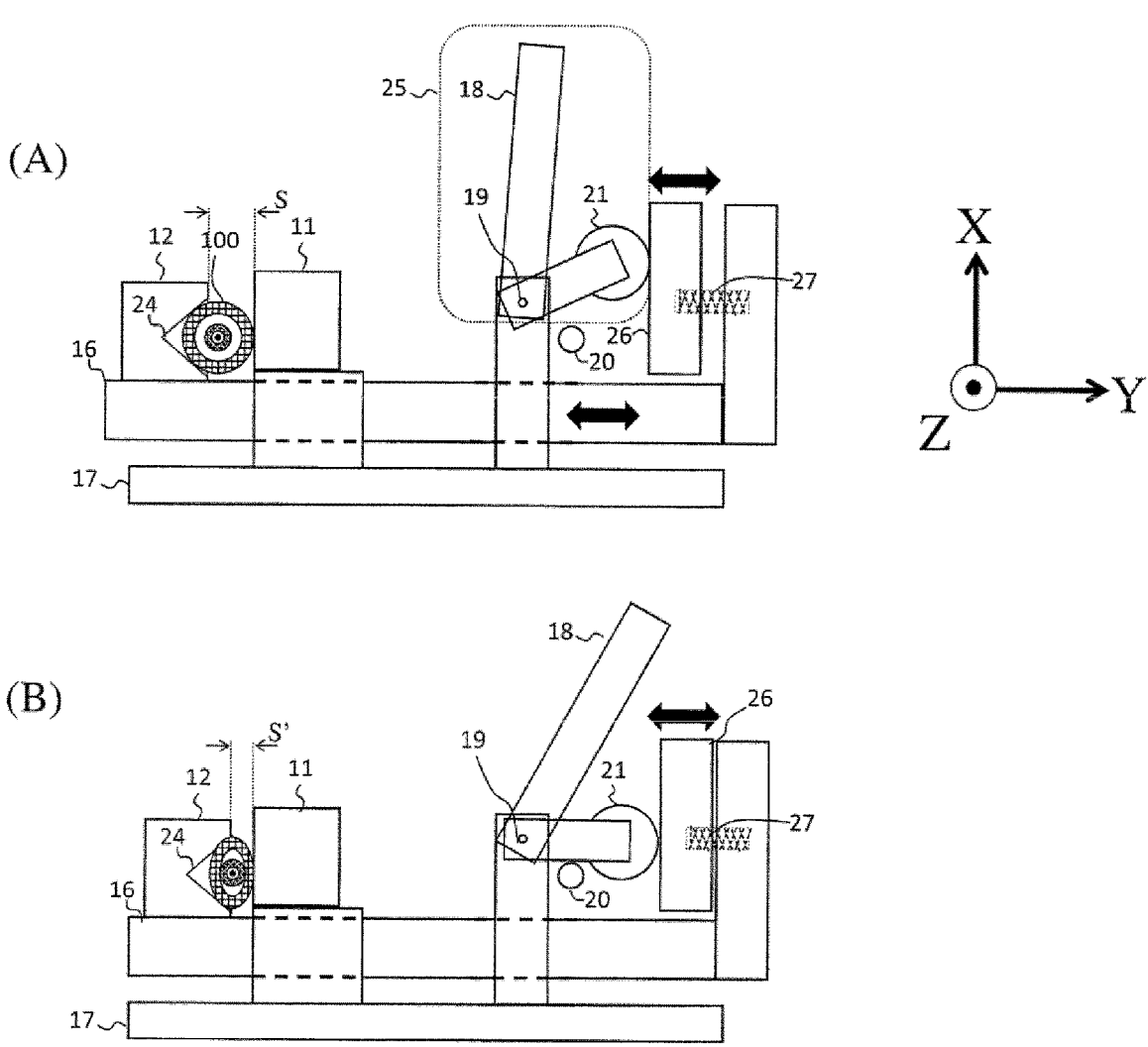
FIG. 13 are diagrams illustrating a specific example of the optical fiber input-output device according to the present invention.

FIGS. 12 and 13 are diagrams illustrating a mechanism for adjusting the pressing force in an optical fiber input-output device according to the present working example. FIG. 12 show a case of the optical fiber core wire of FIG. 9(A) or 9(B), and FIG. 13 show a case of the tube core wire of FIG. 9(C). In the present optical fiber input-output device, the first jig 11 is fixed to a base 17, and an L-shaped jig 25 provided with a lever 18 and a roller 21 is connected to the base 17 via a pivot point 19. A stopper 20 is also fixed to the base 17.

The second jig 12 and a third jig 16 move only in the Y direction by a guide rail or the like. The third jig 16 and a fourth jig 22 are connected to each other via a spring 23.

The L-shaped jig 25 is rotated around the pivot point 19 when the lever 18 is moved downward from the state shown in FIG. 12(A) and FIG. 13(A), and the fourth jig 22 that is in contact with the roller 21 moves in the positive direction of the Y axis. In conjunction therewith, the third jig 16 and the second jig 12 approach the first jig and the distance S is reduced. When the distance S reaches S', the rotation of the L-shaped jig 25 is stopped by the stopper 20 (state as shown in FIG. 12(B) and FIG. 13(B)). At this time, the spring 23 will shrink during the transition from the state as shown in FIG. 12(A) and FIG. 13(A) to the state as shown in FIG. 12(B) and FIG. 13(B).

The tube core wire of FIG. 13 is bent in the state of FIG. 13(B) and light can be transmitted to and received from the optical input-output means 51, whereas the optical fiber core wire of FIG. 12 is not completely bent in the state of FIG. 12(B). In the case of the optical fiber core wire of FIG. 12, an extending force of the spring 23 is additionally used from the state of FIG. 12(B) to bring the first jig 11 and the second jig 12 further close to each other (state of FIG. 12(C)).

Effects

According to the present embodiments, the optical fiber lateral output device can realize high binding efficiency by adjusting the shape of the first jig 11, the shape of the guide groove 24 of the second jig 12, and the pressing force to be applied to the optical fiber core wire 100, regardless of the outer diameter of the optical fiber core wire 100.

REFERENCE SIGNS LIST

11 First jig
12 Second jig
13 Core wire guide
14 Pressing unit
15 Spring
16 Third jig
17 Base
18 Lever
19 Pivot point
20 Stopper
21 Roller
22 Recess portion
23 Projection portion 24 Guide groove
25 L-shaped jig
26 Fourth jig
27 Spring
50 Optical input-output means
100 Optical fiber core wire

The invention claimed is:

1. An optical fiber lateral input/output device comprising:
a first jig including:
   a recess portion that is continuously curved in a longitudinal direction of an optical fiber core wire, a curvature radius of a bottom area of the recess portion being defined as R1, a central angle of the recess portion being defined as θ1; and
   an optical input-output component for causing light to be incident on the optical fiber core wire that is bent and receiving light leaked from the optical fiber core wire;
a second jig including:
   a projection portion that is continuously curved in the longitudinal direction of the optical fiber core wire and is configured to clamp the optical fiber core wire with the recess portion of the first jig, a curvature radius of a tip area of the projection portion being defined as R2, a central angle of the projection portion being defined as θ2; and
   a guide groove that is formed in a curved surface of the projection portion, the optical fiber core wire being fitted into the guide groove; and
a pressing unit configured to apply a pressing force toward the optical fiber core wire in a first direction in which the recess portion of the first jig and the projection portion of the second jig approach each other so as to bend the optical fiber core wire,
wherein R2≤R1 and θ2≤θ1 are satisfied,
the pressing force has a first value and a second value, and the second value is smaller than the first value,
when a distance S between the lowest point of the recess portion and the highest point of the projection portion is equal to or larger than a reference distance S', the pressing force having the first value is applied toward the optical fiber core wire,
when the distance S is smaller than the reference distance S', the pressing force having the second value is applied toward the optical fiber core wire, and
the pressing force having the second value is generated by an elastic member, and the elastic member is configured to apply a reverse pressing force toward the second jig in a second direction which is opposite to the first direction.

2. The optical fiber lateral input/output device according to claim 1,
wherein R1−0.125<R2≤R1 (mm) is satisfied.

3. The optical fiber lateral input/output device according to claim 1,
wherein a first width of the guide groove is smaller than each of second and third widths of the guide groove, and
the first width is located at the tip area of the projection portion of the second jig, and the second and third widths are located at opposite ends of the guide groove, respectively.

4. The optical fiber lateral input/output device according to claim 2,
wherein a first width of the guide groove is smaller than each of second and third widths of the guide groove, and
the first width is located at the tip area of the projection portion of the second jig, and the second and third widths are located at opposite ends of the guide groove, respectively.

5. The optical fiber lateral input/output device according to claim 1, further comprising:
first and second core wire guides disposed at opposite ends of the recess portion of the first jig in the longitudinal direction of the optical fiber core wire, respectively, and configured to guide the optical fiber core wire.

6. The optical fiber lateral input/output device according to claim 3, further comprising:
first and second core wire guides disposed at opposite ends of the recess portion of the first jig in the longitudinal direction of the optical fiber core wire, respectively, and configured to guide the optical fiber core wire,
wherein each of the first and second core wire guides has another groove, a fourth width of the another groove is larger than each of the second and third widths.

7. The optical fiber lateral input/output device according to claim 4, further comprising:
first and second core wire guides disposed at opposite ends of the recess portion of the first jig in the longitudinal direction of the optical fiber core wire, respectively, and configured to guide the optical fiber core wire,
wherein each of the first and second core wire guides has another groove, a fourth width of the another groove is larger than each of the second and third widths.

8. The optical fiber lateral input/output device according to claim 1,
wherein the recess portion is formed at an entirety of a width of the first jig along the longitudinal direction of the optical fiber core wire, and the curvature radius of the recess portion is gradually changed,
the projection portion is formed at an entirety of a width of the second jig along the longitudinal direction of the optical fiber core wire, and the curvature radius of the projection portion is gradually changed.

9. The optical fiber lateral input/output device according to claim 2,
wherein the recess portion is formed at an entirety of a width of the first jig along the longitudinal direction of the optical fiber core wire, and the curvature radius of the recess portion is gradually changed,
the projection portion is formed at an entirety of a width of the second jig along the longitudinal direction of the optical fiber core wire, and the curvature radius of the projection portion is gradually changed.

10. The optical fiber lateral input/output device according to claim 3,
wherein the recess portion is formed at an entirety of a width of the first jig along the longitudinal direction of the optical fiber core wire, and the curvature radius of the recess portion is gradually changed,
the projection portion is formed at an entirety of a width of the second jig along the longitudinal direction of the optical fiber core wire, and the curvature radius of the projection portion is gradually changed.

11. The optical fiber lateral input/output device according to claim 4,
wherein the recess portion is formed at an entirety of a width of the first jig along the longitudinal direction of the optical fiber core wire, and the curvature radius of the recess portion is gradually changed, the projection portion is formed at an entirety of a width of the second jig along the longitudinal direction of the optical fiber core wire, and the curvature radius of the projection portion is gradually changed.

12. The optical fiber lateral input/output device according to claim 5,
wherein the recess portion is formed at an entirety of a width of the first jig along the longitudinal direction of the optical fiber core wire, and the curvature radius of the recess portion is gradually changed,
the projection portion is formed at an entirety of a width of the second jig along the longitudinal direction of the optical fiber core wire, and the curvature radius of the projection portion is gradually changed.

13. The optical fiber lateral input/output device according to claim 6,
wherein the recess portion is formed at an entirety of a width of the first jig along the longitudinal direction of the optical fiber core wire, and the curvature radius of the recess portion is gradually changed,
the projection portion is formed at an entirety of a width of the second jig along the longitudinal direction of the optical fiber core wire, and the curvature radius of the projection portion is gradually changed.

14. The optical fiber lateral input/output device according to claim 7,
wherein the recess portion is formed at an entirety of a width of the first jig along the longitudinal direction of the optical fiber core wire, and the curvature radius of the recess portion is gradually changed,
the projection portion is formed at an entirety of a width of the second jig along the longitudinal direction of the optical fiber core wire, and the curvature radius of the projection portion is gradually changed.

* * * * *